United States Patent
Ou et al.

(10) Patent No.: US 7,532,586 B2
(45) Date of Patent: May 12, 2009

(54) METHOD OF AUGMENTING DEPLOYED NETWORKS

(75) Inventors: Canhui Ou, Danville, CA (US); Orestis Manthoulis, Sausalito, CA (US); David L. Matthews, Algonquin, IL (US); Yew-Aik Michael Lim, Fremont, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 614 days.

(21) Appl. No.: 11/183,402

(22) Filed: Jul. 18, 2005

(65) Prior Publication Data

US 2007/0014247 A1     Jan. 18, 2007

(51) Int. Cl.
*H04L 12/00* (2006.01)

(52) U.S. Cl. .................. 370/254; 370/256; 709/226

(58) Field of Classification Search ............... 370/252, 370/254, 235, 238, 452, 467, 489; 709/223, 709/226; 705/7
See application file for complete search history.

(56) References Cited

U.S. PATENT DOCUMENTS

| | | | |
|---|---|---|---|
| 5,712,981 A | 1/1998 | McKee et al. | |
| 5,887,156 A | 3/1999 | Subramanian et al. | |
| 5,974,127 A * | 10/1999 | Wernli et al. ............ | 379/201.01 |
| 6,052,796 A | 4/2000 | Croslin | |
| 6,546,424 B1 | 4/2003 | Cucchiara | |
| 6,564,258 B1 | 5/2003 | Uniacke | |
| 6,674,839 B2 | 1/2004 | Israelski et al. | |
| 6,795,399 B1 * | 9/2004 | Benmohamed et al. ...... | 370/235 |
| 6,870,813 B1 * | 3/2005 | Raza et al. .................. | 370/238 |
| 6,901,440 B1 | 5/2005 | Bimm et al. | |
| 7,085,697 B1 * | 8/2006 | Rappaport et al. ............ | 703/13 |
| 7,168,044 B1 * | 1/2007 | Mao ........................... | 715/736 |
| 7,308,494 B1 * | 12/2007 | Drew et al. .................. | 709/223 |
| 2002/0187770 A1 | 12/2002 | Grover et al. | |
| 2003/0058798 A1 | 3/2003 | Fleischer et al. | |
| 2003/0158765 A1 * | 8/2003 | Ngi et al. ....................... | 705/7 |
| 2003/0187967 A1 | 10/2003 | Walsh et al. | |
| 2004/0042495 A1 * | 3/2004 | Sandstrom .................. | 370/489 |
| 2004/0083277 A1 | 4/2004 | Chaporkar et al. | |
| 2004/0143428 A1 | 7/2004 | Rappaport et al. | |
| 2004/0240385 A1 | 12/2004 | Boggs et al. | |
| 2005/0065805 A1 | 3/2005 | Moharram | |
| 2005/0113098 A1 | 5/2005 | Cankaya et al. | |

FOREIGN PATENT DOCUMENTS

WO     2004/056041 A1     7/2004

* cited by examiner

*Primary Examiner*—Dang T Ton
*Assistant Examiner*—Mohamed Kamara
(74) *Attorney, Agent, or Firm*—Brooks Kushman P.C.

(57) ABSTRACT

Method of augmenting a deployed network to include additional network elements. The method includes instructions for determining whether a deployed network is sufficient for supporting existing customer and future customer demands and generating an augmented network design if the deployed network is insufficient. The augmented network design includes new network nodes such that deployed network is a subset of the augmented network, thereby permitting augmenting of the deployed network without interruption services to the existing customers supported by the deployed network.

13 Claims, 2 Drawing Sheets

METHOD OF AUGMENTING DEPLOYED NETWORKS

BACKGROUND OF THE INVENTION

1. Field of the Invention

The present invention relates to methods of augmenting deployed networks.

2. Background Art

A network may be characterized by several factors, like who can use the network, the type of traffic the network carries, the medium carrying the traffic, the typical nature of the network's connections, and the transmission technology the network uses. For example, one network may be public and carry circuit switched voice traffic while another may be private and carry packet switched data traffic. Whatever the make-up, most networks facilitate the communication of information between at least two nodes, and as such act as communications networks.

At a physical level, a communication network may include a series of nodes interconnected by communication paths. Whether a network operates as a local area network (LAN), a metropolitan area networks (MAN), a wide are network (WAN) or some other network type, the act of designing the network becomes more difficult as the size and complexity of the network grows. When designing a given network, an operator or provider may decide where to physically locate various network nodes, may develop an interconnection strategy for those nodes, and may prepare a list of deployed and/or necessary networking components.

One challenge network planners face after deploying such networks relates to augmenting so called green-field designs without affecting the services of existing customers.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Given the relative complexity of some communication networks, designers may invest a great deal of time and money trying to augment a deployed network. An augmented design may be one that satisfies design objectives like network coverage, network availability, and traffic demands, while taking into account design limiters, like defined limitations on equipment and/or interconnection topology. A system and/or technique incorporating teachings of the present disclosure may assist these network designers and provide them with a mechanism for "augmenting" their network designs.

Figure 1:
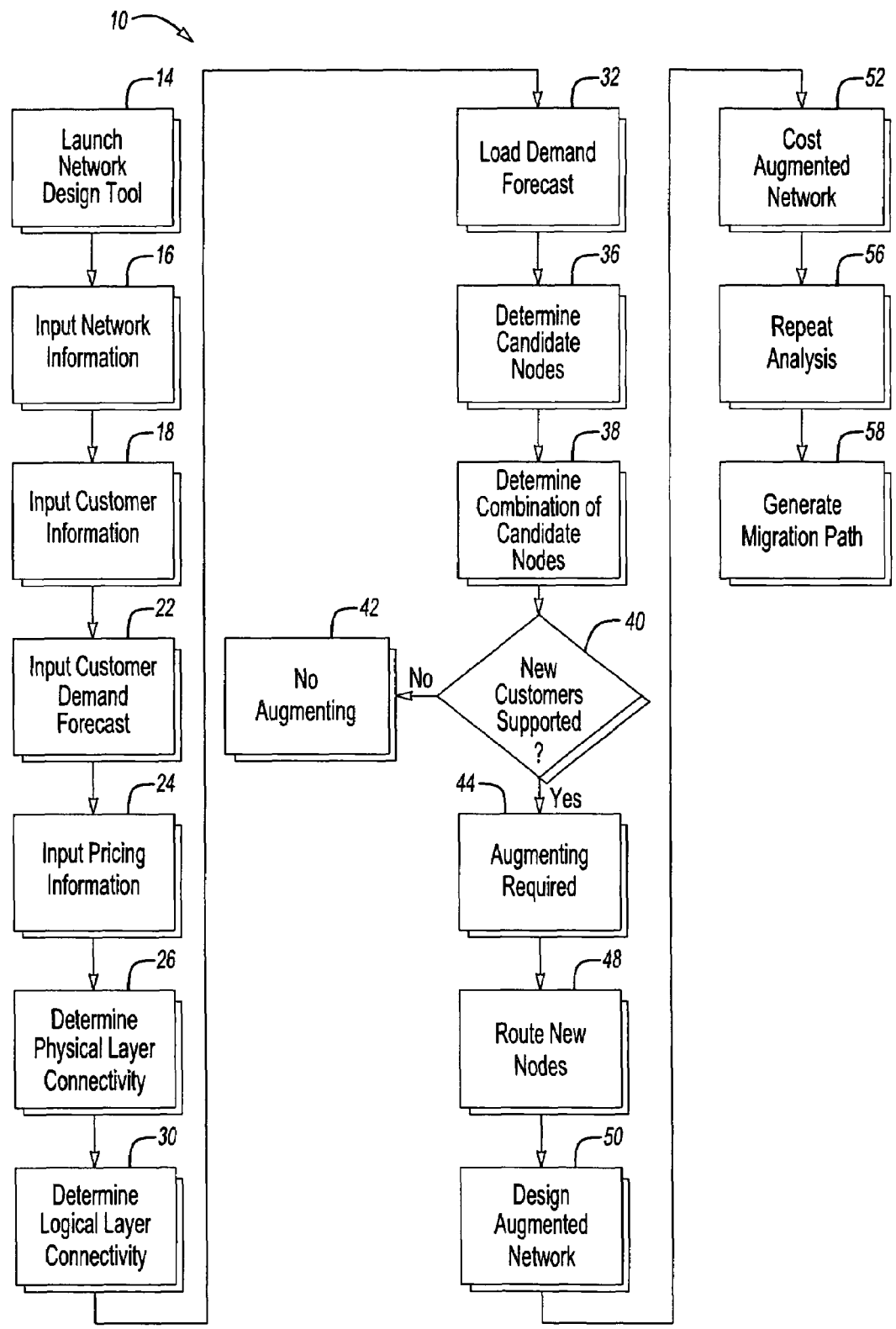
FIG. 1 illustrates a flowchart of a method for augmenting a network in accordance with one non-limiting aspect of the present invention.

FIG. 1 presents a flow diagram for augmenting an Ethernet Optical Network (EON) in accordance with the teachings of the present disclosure. The following description focuses on EON design, but the techniques of FIG. 1 and this disclosure could also be used to design other types of networks.

As mentioned above, networks may take several forms. For example, deployed networks may embody a high-speed, fiber-based, Ethernet over Multiprotocol Label Switching (MPLS) network. Using MPLS allows an operator to integrate Layer 2 information about network links like bandwidth and latency into Layer 3. As such, in an MPLS-based network, a network operator enjoys greater flexibility when routing traffic around link failures, congestion, and bottlenecks. From a Quality of Service (QoS) perspective, MPLS-based networks also allow network operators to better manage different kinds of data streams based on priority and/or service plans.

In operation, a packet entering an MPLS network is given a "label" by a Label Edge Router (LER). The label contains information based on routing table entry information, the Internet Protocol (IP) header information, Layer 4 socket number information, differentiated service information, etc. As such, different packets are given different Labeled Switch Paths (LSPs), which allow network operators to make better decisions when routing traffic based on data-stream type.

A switched Ethernet network is a broadband product which utilizes optical Ethernet as the transmission media to provide layer 2 networking services in metro areas. Both point-to-point traffic and point-to-multipoint traffic is supported in such networks. The network consists of three layers: access, aggregation and core. The access layer, also known as PE-CLE (Provider Edge-Customer Location Equipment), provides the interface to the customer at the customer premises.

The aggregation layer, also known as PE-POP (Provider Edge-Point of Presence), aggregate the incoming traffic from the access layer and forward outgoing traffic to the access layer. The aggregation nodes provide interfaces to access nodes via GigE interfaces and to core nodes via MPLS interfaces. Each aggregation node may be required to connect to at least two core nodes for redundancy purpose.

The core layer aggregates the traffic from the aggregation layers. Core layer nodes may be interconnected such that traffic from different areas (e.g., central offices) can be routed. Of course, if the traffic is between two access layer nodes homed at the same aggregation node, the traffic is routed directly by the aggregation node. Core nodes can interconnect with each other in a mesh configuration, however, each core node may be required to be connected to at least 2 other core nodes via physically diverse fiber routes for redundancy purposes.

In one embodiment, the core layer and the aggregation layer are physically collapsed into one while maintaining the logical separation. In that case, a combo box is used to provide functionality associated with both roles of an aggregation node and a core node.

A method for augmenting a network as set forth in flowchart 10 of FIG. 1 begins at block 14, where a network designer launches a network design tool. The tool may be local to a computer being accessed by the user. It may also be remotely located at a server, for example, and the user may access the tool from a local client.

Block 16 relates to inputting network state and fiber topology information to the tool. The network state and fiber topology information is used to represent a deployed network and its network elements. For example, the information includes a list of central offices (COs); number of spares, distance, and cost of laying new fibers; location and configuration of existing core and aggregator nodes; logical layer connectivity, i.e., port-level connection information of existing aggregator and core nodes, e.g., port number 3 on line-card 4 on aggregator-node X is connected to port number 5 on line-card 2 on core-node Y; physical layer connectivity, e.g., the logical link between aggregator node X and core node Y traverses through fibers f1, f2, . . . , fn, homing information of the existing customers, e.g., customer C is homed to aggregator X. The information may be extracted from a Trunk Integrated Records Keeping system (TIRKS) or and Enterprise Data Warehouse (EDW).

Block 18 relates to inputting existing customer information to the tool. This includes a location of the customer, customer bandwidth requirements, customer class of service, and other parameters associated with services provided to the customer. The customer information, as described below in more detail, is used to insure uninterrupted services to the customer during augmentation of the network.

Block 22 relates to inputting a forecast of customer demand into the tool. The forecast includes a yearly estimate of customer demand segregated by type of service, e.g., 100 Mbps, GigE, single tenant unit (STU), multiple tenant unit (MTU), etc. The forecast is further classified by class of service, e.g., bronze or silver. In more detail, the class of service specifies performance guarantees for a number of customers, such as bandwidth guarantees for customers connected to the same aggregator node. For example, internodal trunk links are required to support greater bandwidths for customers having greater classes of service.

Block 24 relates to inputting, to the tool, configuration and pricing information for the deployed network and other features which is used to augment the network. This information includes types of network elements, e.g., 7609 Internet Router Switches with 4-port cards and 16-port cards, etc.; pricing information of different components, e.g., 4-port MPLS card, 16-port non-MPLS card, repeater, etc.; administrative preferences, e.g., candidate COs for core nodes and candidate COs for aggregators; installed price for a fiber pair on a per mile basis; and aggregate fiber pricing for installing new fiber on a per mile basis based on Infrastructure Deployment Guidelines (IDG).

Block 26 relates to creating a physical layer connectivity graph of the network by extracting the CO list and fiber list. The physical layer connectivity graph is used to analyze physical level connections between nodes and customers, such as aggregator node X and core node Y traverses through fibers f1, f2 . . . , fn. Physical-layer connectivity can be extracted from TIRKS.

represented as a graph of $G=(V, E)$, where V, the set of vertices, is the list of COs and E, the set of edges, is the list of fibers.

Block 30 relates to creating a logical layer connectivity graph of the network. The logical layer connectivity graph is used to illustrate relationships between nodes without describing the physical connections required to connect the nodes, such as with port-level connection information of existing aggregator and core nodes, e.g., port number 3 on line-card 4 on aggregator-node X is connected to port number 5 on line-card 2 on core-node Y.

The logical layer connectivity graph can be derived from the circuit information in TIRKS or any inventory systems. For example, if there is a circuit from CO A to CO Z, CO A and CO Z is considered to be logically connected even though CO A may need to go through a series of fibers to reach CO Z. The logical layer connectivity can then be represented as a graph $G1=(V, E)$, where V is the list of aggregator and core nodes, and E is their connectivity, i.e., if two nodes in V are logically connected.

Block 32 relates to loading a source to destination (A-Z) demand forecast for each existing and forecasted customer into this tool. The A-Z demand forecast details termination points for a source and destination location associated with each customer. This information can be include with the inputted forecast and/or entered in a separate operation. The A-Z demand can be combined with the physical and logical layer connectivity graphs to facilitate determining expected usage, bandwidth, and other requirements of operation for the locations associated with supporting the customers.

Optionally, if the A-Z demand is not available, one or more of the core or aggregator locations associated with the customers is specified. A ratio of estimated usage is used to determine the amount of internodal traffic. If the locations are not specified, the A-Z demand can emulated by using a per-wire center demand, and by distributing the traffic between the locations weighted by the total amount of traffic that originates/terminates from each location. In this manner, usage, bandwidth, and other requirements of operation for the locations associated with supporting the customers is determined in the absence of an A-Z demand.

| A-CLLI | Z-CLLI | SUB_PATH | CBL | TOT | SPARE | LENGTH |
| --- | --- | --- | --- | --- | --- | --- |
| WBFDMIMN | WBLTMIAS | CF0001 | F02 | 4 | 0 | 5.5 |
| FLRKMIFR | FLRKMILE | CLF001 | F03 | 6 | 2 | 0.7 |
| MDHGMIFP | MDHGMIHP | CLF001 | FR04OUT | 2 | 2 | 2.4 |
| DRBRMIDB | DRBRMIVA | CF0001 | F09 | 6 | 6 | 2.1 |
| WASHMIWA | WIPMMIBZ | CF0001 | LG03 | 12 | 12 | 4.1 |

For example, a sample list of fibers extracted from TIRKS is shown in the table below.

The first two fields are the CLLI codes for the beginning and ending central office (CO) locations for the fiber. The third field is called the "SUB_PATH" and is used for distinguishing between two different fiber routes between the same COs. The fourth field is the cable name. The combination of the first four fields is used to uniquely identify a fiber in the deployed network. The fifth field is the total number of fiber strands in the fiber cable (e.g. each "link" may use 2 fiber strands). The sixth field is the number of spare fiber strands in the cable. The seventh field is the length of the fiber cable in miles. Therefrom, the physical layer connectivity may be Block 36 relates to selecting a list of candidate core or aggregator locations which is used to augment the deployed network to support increases in customer demand. The list includes identifying one or more of the nodes deployed in the network. The list is specified by a user to reflect administrative preference or can be determined by the tool. For example, the tool can take the top X COs with the most amount of traffic as the candidate aggregator locations and the top Y COs with the maximum connectivity as the candidate core locations. Other selection criteria can also be incorporated into the tool. In this manner, an operator limits the number of nodes for analysis based on subjective preferences, experience, or other criteria.

Block 38 relates to selecting a particular combination of the core and aggregator locations identified as being potentially suitable for supporting new customers and routing new customers identified in the demand forecast to the aggregators by applying a shortest-path, min-cost, or other analysis algorithm. A modified physical or logical connectivity graph is generated to describe the augmented network.

Block 40 relates to analyzing whether the demands of the new customers are supported by the deployed nodes while also permitting the nodes to meet the demands of the existing customers. This includes analyzing the customer information of the existing customers against the forecasted customer demands in order to insure uninterrupted operation. Block 42 relates to deployed network having sufficient resources to support the new customers such that network augmenting is not needed.

Block 44 relates to an inability of the deployed network to support the new customers and the corresponding need to augment the deployed network. Optionally, new core and/or aggregator nodes are added to the graph if needed to support the new customers. For example, if the existing nodes are unable to support both the existing and expected customers, new nodes are added to support the new customers so that the connectivity of the existing customers can be maintained. In this manner, the existing customers remain connected to the same nodes and new nodes are added to support the new customers. Necessarily, this methodology requires the resulting (augmented) network to include the originally deployed network as a subset thereof, as this is the means by which the original connectivity of the existing clients is maintained.

In more detail, the tool is configured to augment the network according to the foregoing description so as to support new customers without disrupting service to existing customers. This is done by insuring the deployed network is a subset of the augmented network, i.e., the connections of each existing customer are maintained in the augmented network. If the existing customer connections cannot support the new customers, then additional nodes are added to the system, as described above. This allows new customers to be routed without disrupting current customer while also providing economical locations to lay new fibers.

Block 48 relates to routing the new nodes used to augment the deployed network. This includes routing the new aggregators to at least two core nodes via diverse paths. This is done by applying Suurballe's algorithm to the modified graph in which a dummy node is added to the graph and the dummy node is connected to all the core nodes. (Suurballe's algorithm can find two link or node disjoint paths between two nodes.) The tool analyzes multiple paths for each node to determine the most cost effective solution.

Block 48 relates to routing the new core nodes to at least two core nodes via diverse paths in a way similar to the previous step. This is done in a manner similar to that described above with respect to the new aggregator nodes. The multiple redundancy of the aggregator and core nodes is advantageous in optical and non-optical networks in the event of failure or other interruption to one or more of the nodes.

Block 50 relates to performing a detailed network design and sizing the aggregator and core nodes based on the connectivity determined in the previous steps. This includes analyzing the devices available for supporting the new network and selecting those which meet the customer demands. The analysis associated with this block is included with the foregoing blocks where new core and/or aggregator nodes are selected, i.e., as the selection thereof is based on the capabilities of the node to support new customers.

Block 52 relates to calculating the incremental cost of the design determined for the selected core and aggregator nodes. This includes analyzing the cost of each new feature used to augment the deployed network and cost associate with implementing the device(s). The cost is broken out over the forecast demand intervals if the deployed network is incrementally expanded over time as demand increases.

Block 56 relates to repeating blocks 44-52 for another combination of core and aggregator locations and determining the combination with the minimum incremental cost. The tool can perform an exhaustive search to go through every possible combination of core and aggregator locations. Alternatively, the tool can search a list of desirable combinations selected based on the criteria in Block 38.

Block 58 relates to generating a migration path from the existing design to the new optimal design and outputting the detailed new optimal design and the migration path. For example, the output includes a number of different types of line/MPLS trunk cards that need to be populated at existing core and aggregator nodes; location and configuration of new core and aggregator nodes; new logical layer connectivity, i.e., port-level connection information of existing aggregator and core nodes, e.g., port number 3 on line-card 4 on aggregator-node X is connected to port number 5 on line-card 2 on core-node YZ; new physical layer connectivity, e.g., the logical link between aggregator node X and core node Y traverses through fibers f1, f2, . . . , fn; homing of new customers and their physical fiber routes; migration path from the existing design to the augmented design, i.e., the difference between the existing design and the augmented design; and incremental cost in terms of equipment and transmission cost.

In accordance with one non-limiting aspect of the present invention, an augmented network design is a completely drawn network topology, including the locations of all the aggregators and core switches, logical connectivity of all the switching nodes, physical fiber route of each logical link, the primary and backup routes, homing of every customer, and line card configuration of all the switches.

A network design is determined to be feasible if it meets all the equipment constraints, satisfies all traffic demand, and meets all network survivability and availability requirements. A feasible network design is called optimal if it incurs the lowest total cost in terms of equipment cost and transmission cost.

An existing network design is augmented successfully if the deployed design is a subset of the augmented design, i.e., the augmentation process only requires adding network element to the existing design. Incremental augmentation includes populating additional blades at existing switching nodes, adding new switching nodes at strategic locations, provisioning more GigE trunk links, and laying new fibers.

One aspect of the present invention is to provide a method to incrementally augment an existing switched Ethernet network design based on provisioned and forecasted traffic without disrupting the provisioned traffic. Advantageously, the method is used to keep the initial cost down and grow the network on an as-needed basis. By the approach of the present invention, the initial first cost of building a switched Ethernet network can be kept minimum. As demand picks up, the approach of the present invention can be used to augment the initial network incrementally. As a result, the approach of the present invention effectively delays capital investment. The present invention is also used to prevent overbuilding or underbuilding the network due to inaccuracy in traffic forecast. While the demand for switched Ethernet services is growing rapidly, the demand can be very volatile. As a result, long-term traffic forecast often times are far away from accurate. The approach of the present invention is used to provide a method to augment the network as needed, and effectively compensate for the inaccuracy in traffic forecast.

Figure 2:
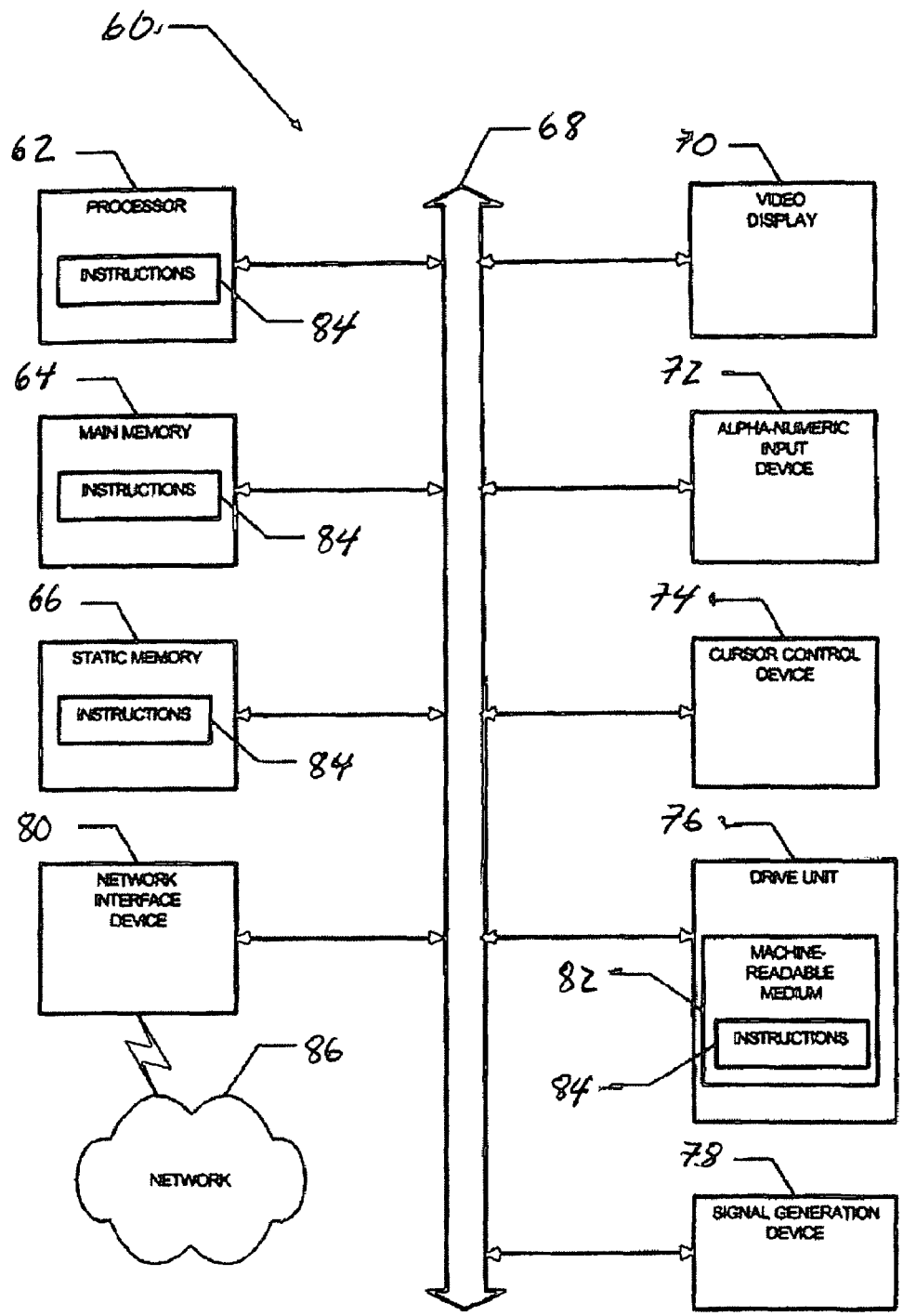
FIG. 2 illustrates a diagrammatic representation of a machine in accordance with one non-limiting aspect of the present invention.

FIG. 2 is a diagrammatic representation of a machine in the form of a computer system 60 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 60 may include a processor 62 (e.g., a central processing unit (CPU), a graphics processing unit (GPU), or both), a main memory 64 and a static memory 66, which communicate with each other via a bus 68. The computer system 60 may further include a video display unit 70 (e.g., a liquid crystal display (LCD), a flat panel, a solid state display, or a cathode ray tube (CRT)). The computer system 60 may include an input device 72 (e.g., a keyboard), a cursor control device 74 (e.g., a mouse), a disk drive unit 76, a signal generation device 78 (e.g., a speaker or remote control) and a network interface device 80.

The disk drive unit 76 may include a machine-readable medium 82 on which is stored one or more sets of instructions (e.g., software 84) embodying any one or more of the methodologies or functions described herein, including those methods illustrated in herein above. The instructions 84 may also reside, completely or at least partially, within the main memory 64, the static memory 66, and/or within the processor 62 during execution thereof by the computer system 60. The main memory 64 and the processor 62 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 84, or that which receives and executes instructions 84 from a propagated signal so that a device connected to a network environment 86 can send or receive voice, video or data, and to communicate over the network 86 using the instructions 84. The instructions 84 may further be transmitted or received over the network 86 via the network interface device 80.

While the machine-readable medium 82 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A network design method comprising:
   inputting network information describing a number of aggregator nodes and core nodes associated with a deployed network in which each of the aggregator nodes is connected to at least two of the core nodes and each of the core nodes is connected to at least two other of the core nodes and the aggregator nodes and the core nodes are located at central offices associated with the deployed network;
   inputting customer information describing demands of existing customers supported by the deployed network;
   inputting forecast information describing future customer demands;
   determining whether the deployed network is sufficient for supporting the existing and future customer demands;
   determining a number of new aggregator nodes and new core nodes to add to the deployed network to support the existing and future customer demands if the deployed network is insufficient for supporting the existing and future customer demands;
   determining which central offices associated with the deployed network are candidates for receiving the new aggregator nodes as a function of traffic volume handled by the aggregator nodes of the central offices such that the central offices having the highest traffic volume are the candidates for receiving the new aggregator nodes;
   determining which central offices associated with the deployed network are candidates for receiving the new core nodes as a function of connectivity of the core nodes of the central offices such that the central offices having the highest connectivity are the candidates for receiving the new core nodes; and
   generating an augmented network design for augmenting the deployed network to include the new aggregator nodes at the central offices which are the candidates for receiving the aggregator nodes and to include the new core nodes at the central offices which are the candidates for receiving the new core nodes such that the deployed network is a subset of the augmented network with the connectivity provided by the aggregator nodes and the core nodes associated with the deployed network to the existing customers remaining the same on both the deployed network and the augmented network, thereby permitting augmenting of the deployed network without interruption of services to the existing customers supported by the deployed network.

2. The method of claim 1 further comprising generating an incremental augmented network design to support incremental increases in customer demands.

3. The method of claim 2 further comprising determining an incremental cost for incrementally increases included with the incremental augmented network design.

4. The method of claim 1 further comprising generating the augmented network design such that each new aggregator node routes to at least two other aggregator nodes via physically diverse paths.

5. The method of claim 1 further comprising generating the augmented network design such that each new core node routes to at least two other core nodes via physically diverse paths.

6. The method of claim 1 further comprising generating the augmented network designs such that each access node associated with the deployed network routes to the closest aggregator node.

7. The method of claim 6 further comprising generating the augmented network design such that multiple access nodes in one location route to the closest aggregator node via different physical routes.

8. The method of claim 1 wherein determining the number of new aggregator nodes and new core nodes includes sizing of logical links.

9. The method of claim 1 wherein generating the augmented network design includes generating a migration path from a current network design to the augmented network design.

10. A computer-readable medium for use in facilitating augmentation of a deployed network having aggregator nodes and core nodes in which each of the aggregator nodes is connected to at least two of the core nodes and each of the core nodes is connected to at least two other of the core nodes and in which the aggregator nodes and the core nodes are located at central offices associated with the deployed network, the computer-readable medium encoded with:
   computer executable instructions for inputting network information describing the aggregator nodes and the core nodes of the deployed network;
   computer executable instructions for inputting customer information describing demands of existing customers supported by the deployed network;
   computer executable instructions for inputting forecast information describing future customer demands;
   computer executable instructions for determining whether the deployed network is sufficient for supporting the existing customer and future customer demands;
   computer executable instructions for determining new aggregator nodes and new core nodes to add to the deployed network to support the existing and future customer demands if the deployed network is insufficient for supporting the existing and future customer demands;

computer executable instructions for determining which central offices associated with the deployed network are candidates for receiving the new aggregator nodes as a function of traffic volume handled by the aggregator nodes of the central offices such that the central offices having the highest traffic volume are the candidates for receiving the new aggregator nodes;

computer executable instructions for determining which central offices associated with the deployed network are candidates for receiving the new core nodes as a function of connectivity of the core nodes of the central offices such that the central offices having the highest connectivity are the candidates for receiving the new core nodes; and computer executable instructions for generating an augmented network design to include the new aggregator nodes at the central offices which are the candidates for receiving the new aggregator nodes and to include the new core nodes at the central offices which are the candidates for receiving the new core nodes such that the deployed network is a subset of the augmented network with the connectivity provided by the aggregator nodes and the core nodes associated with the deployed network to the existing customers remaining the same on both the deployed network and the augmented network, thereby permitting augmenting of the deployed network without interruption of services to the existing customers supported by the deployed network.

11. The computer-readable medium of claim 10 further encoded with computer executable instructions for automatically calculating costs associated with adding the new aggregator nodes and the new core nodes as a function of pricing information associated therewith.

12. The computer-readable medium of claim 10 further encoded with computer executable instructions for generating the augmented network design such that each new aggregator node routes to at least two other aggregator nodes.

13. The computer-readable medium of claim 10 further encoded with computer executable instructions for generating the augmented network design such that each new core node routes to at least two other core nodes.

* * * * *